United States Patent [19]

Eckenbrecht

[11] Patent Number: 4,758,901

[45] Date of Patent: Jul. 19, 1988

[54] CONTINUOUS AUDIO RECORDING IN A SKIP-FIELD VIDEO RECORDER

[75] Inventor: Robert R. Eckenbrecht, East Bethany, N.Y.

[73] Assignee: Eastman Kodak Company, Rochester, N.Y.

[21] Appl. No.: 915,488

[22] Filed: Oct. 28, 1986

[51] Int. Cl.$^4$ .............................................. H04N 5/78
[52] U.S. Cl. ............................ 360/11.1; 358/313;
358/906; 358/343; 360/19.1
[58] Field of Search .................... 560/19.1, 10.1, 11.1;
358/343, 313, 906

[56] References Cited

U.S. PATENT DOCUMENTS

| | | | |
|---|---|---|---|
| 3,359,365 | 12/1967 | Kihara | 358/19.1 |
| 3,748,381 | 7/1973 | Stroebele et al. | 360/19.1 X |
| 3,908,080 | 9/1975 | Broadbent | 358/343 |
| 3,924,062 | 12/1975 | Broadbent | 358/343 |
| 4,670,796 | 6/1987 | Kobayashi et al. | 360/19.1 |

*Primary Examiner*—Aristotelis M. Psitos
*Attorney, Agent, or Firm*—Robert M. Wallace

[57] ABSTRACT

In a skip-field video recorder, the audio signal of every field is continuously recorded. The audio signal of each skipped video field is stored in an audio field store memory and then unloaded during the recording of the next (unskipped) video field. The unloaded audio signal is multiplexed with the current incoming audio signal and recorded therewith. Alternatively, the audio signals of both the skipped field and the unskipped field may be compressed and recorded in an extended portion of each video tape track.

1 Claim, 2 Drawing Sheets

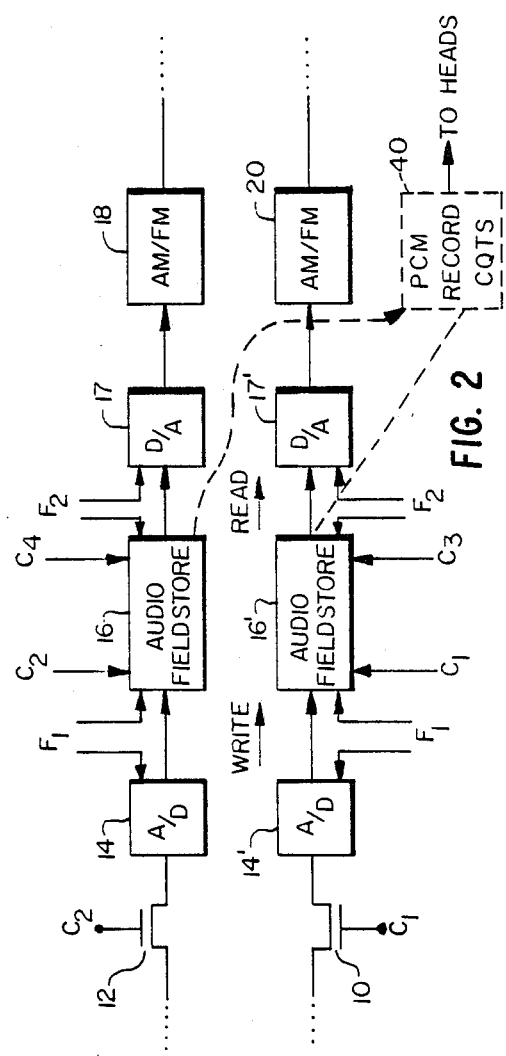
*FIG. 2*
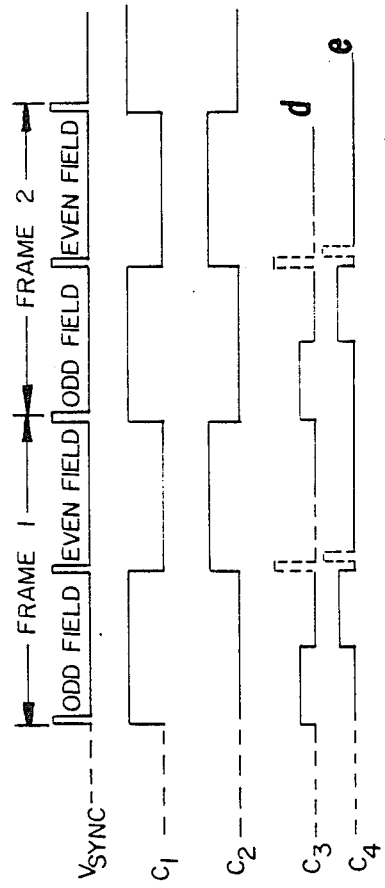
*FIG. 4*
*FIG. 3*

CONTINUOUS AUDIO RECORDING IN A SKIP-FIELD VIDEO RECORDER

TECHNICAL FIELD

The invention is related to skip-field video cassette recorders wherein only the odd video fields, for example, are recorded and the even video fields are not recorded—so that the tape may be transported at half-speed to double the record or play time of the video tape cassette.

DESCRIPTION OF RELATED ART

Typically, a skip-field video cassette recorder omits recording the video and audio signal of alternate video fields in order to double the cassette play time. Generally, this poses no problem during playback of the video signal, since the skipped fields can be "filled in" by simply repeating the previous recorded field. This is perfectly acceptable for most home video recording applications but presents a serious impediment if the video signal was originally accompanied by high fiedelity stereo sound. For example, skipping every other field of the sound signal produces a noticable loss in fidelity of the recorded audio signal. It may even introduce a sixty cycle "buzz".

One possible solution to this problem is described in U.S. Pat. No. 4,135,205, in which a skip-field video recorder samples the audio signal during half-horizontal line intervals, the audio signal of odd video fields being recorded during the second half of each horizontal line and the audio signal of even video fields being recorded during the second half of each horizontal line of each unskipped video field. While this may reduce the problem of a sixty cycle buzz or other distortion in the recorded audio signal, only one half of the audio signal is sampled. Thus, there is still a significant loss of audio fidelity.

The audio recording quality of most video systems is ususally very good, producing very high fidelity stereo audio. Thus, the prior art technique of skipping "or failing to sample" half of the audio signal during skip-field video recording produces a noticeable loss of fidelity and constitutes a significant limitation in the art. Therefore, a great need exists for a skip-field video recorder which records the audio signal without an appreciable loss of audio fidelity.

Problem

The problem is how to perform skip-field video recording without reducing sound quality from that obtained in normal video recording.

SUMMARY OF THE INVENTION

Solution to the Problem

The skip-field video recorder of the present invention records the entire audio signal accompanying the incoming video signal without any appreciable loss of audio fidelity. In the invention, the audio signal of each skipped video field is not itself skipped but rather stored in an audio field store memory and then is unloaded during the recording of the next (unskipped) video field, the audio signals of the two fields being multiplexed together for recording.

Ordinarily, the audio signal of each (unskipped) video field is recorded as an FM audio signal on an FM carrier whose frequency lies between the luminance band and the color-under chrominance band. In one embodiment of the invention, the audio signal of the previous (skipped) field (unloaded from the audio field store memory) is mixed with an FM sub-carrier and then frequency-multiplexed with the audio signal of the current unskipped field on the main FM audio carrier. Alternatively, the current and stored audio signals may be time-division multiplexed together. Both frequency multiplexing and time division multiplexing may be employed in combination where the audio signal comprises a two-channel stereo signal (requiring four audio channels to be recorded during every other video field). In yet another embodiment of the invention, the audio signal of every video frame is compressed and recorded in an extended portion of a corresponding video tape track immediately following the video field recorded in the main portion of that track. This last embodiment is particularly adaptable to 8 mm video recording systems, in which the audio signal of each field is stored while the video field is recorded during a head-drum rotation of 180°. The stored audio signal is then compressed and digitally recorded as a pulse code modulated (PCM) signal in the so-called "PCM" tracks on the tape (i.e., that portion of each track scanned during rotation of each head from 180° to 216°).

Advantages

The invention takes full advantage of the high frequency capabilities of video recording systems for recording high fidelity audio signals while permitting alternate video fields to be skipped with no loss of audio fidelity. Thus, the play time of a video cassette may be doubled with virtually no appreciable loss in audio fidelity. The invention overcomes the prior art limitations of skip-field recording, such as omitting half of the audio signal. In the industry standard 8 mm video recording format, the invention is equally useful for multiplexing odd and even fields of the audio signal on the FM audio carrier, or for compressing and recording the audio signals of odd and even fields in the extended ("PCM") track portions. (The invention is also applicable to VHS and Beta systems.)

DESCRIPTION OF THE DRAWINGS

The invention may be understood by reference to the accompanying drawings, of which:

FIG. 2 is a schematic diagram of an alternative embodiment of the invention;

FIG. 3 includes contemporaneous timing diagrams illustrative of the operation of the embodiments of FIGS. 1 and 2; and FIG. 4 illustrates the recording of audio and video signals in accordance with an alternative embodiment of the invention.

DETAILED DESCRIPTION

Figure 1:
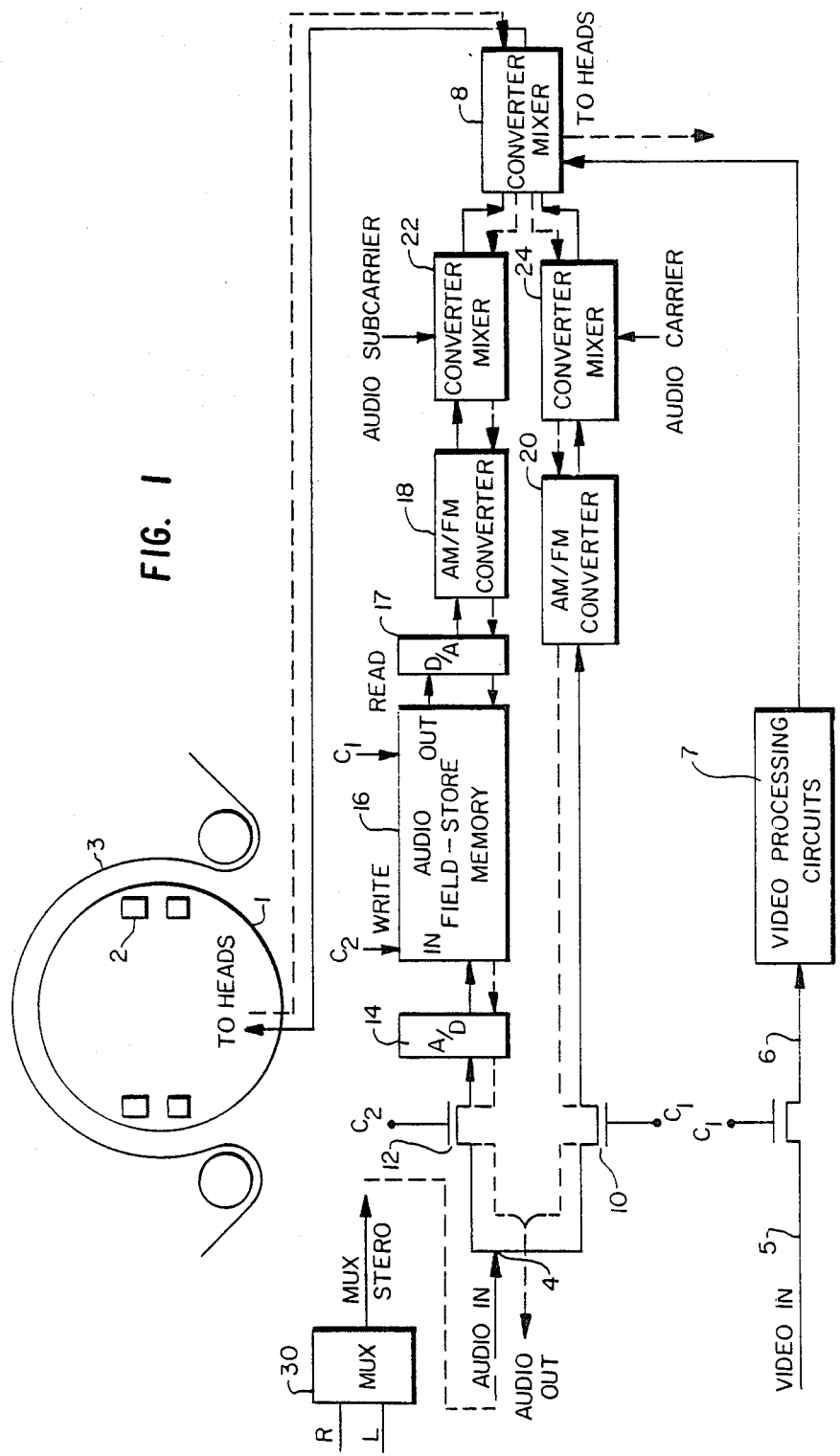
FIG. 1 is a schematic diagram of the preferred embodiment of the invention.

Referring to FIG. 1, a skip-field video recorder includes a rotary drum 1 on which are mounted a plurality of heads 2 which record helically scanned tracks on a video tape 3 in the well-known manner. Such skip-field video recorders are described in U.S. patent application Ser. No. 908,750, filed on Sept, 18, 1986 and entitled ZERO GUARD-BAND SKIP-FIELD VIDEO CASSETTE RECORDER by Hans Peter Baumeister, et al. and assigned to Eastman Kodak Company. In the present invention, an audio signal and a video signal to be recorded together are received at an audio input port 4 and a video input port 5, respectively. Alternate (odd) fields of the video signal are gated through a switch 6 and applied through video processing circuits 7 and a converter-mixer 8 to the heads 2 for skip-field recording on the tape 3. Alternate (odd) fields of the audio signal received at the audio port 4 are gated through a switch 10. The remaining (even) fields of the audio signal are gated through a switch 12. The switch 10 is controlled by a clock signal $C_1$ (illustrated in FIG. 3b) synchronized with the video $V_{sync}$ signal (illustrated in FIG. 3a). The clock signal $C_1$ is on only during odd video fields and is off during even fields. Thus, the video signal and audio signal of each odd field is recorded on the tape 3, the even fields being skipped. The audio signal of the even fields is gated through the switch 12 in synchronism with a clock signal $C_2$ (illustrated in FIG. 3c) through an analog-to-ditial converter 14 for loading and storage in an audio field store memeory 16. The stored audio signal is unloaded from the memory 16 at the conclusion of the previous even video field and beginning of the current odd field through a digital-to-analog converter 17 in synchronism with the clock signal $C_1$. AM/FM converters 18, 20 simultaneously receive the audio signals of the previous even and current odd video fields respectively, and produce a corresponding pair of FM audio signals which are applied to converter-mixers 22, 24, respectively. The odd field audio signal is mixed by the converter 24 with a main audio carrier. The even field audio signal is mixed by the converter 22 with an audio sub-carrier, the output of the converters 22, 24 being combined in the converter 8 with the odd field video signal for transmission to the heads 2. As a result, the heads 2 receive a frequency multiplexed audio signal comprising the odd field audio signal on the main audio carrier and the even field audio signal on the subcarrier. Thus, a skip-field video signal is recorded with a continuous (high fidelity) audio signal on the tape 3. The invention takes advantage of the fact that, even with a skip-field video recorder, there is sufficient bandwidth to record two audio signals simultaneously.

During playback, the reverse process is performed, as indicated in dashed line. Specifically, the signal picked up by the heads 2 is separated by the converter 8 into a playback odd field video signal, an odd field audio signal (on the main audio carrier), and an even field audio signal (on the audio subcarrier). The converters 22, 24 then separate the two audio signals from the main audio carrier and the main audio subcarrier, respectively, for application to the AM/FM converters 18, 20, respectively.

During the playback process, the converter 17 acts as an analog-to-digital converter while the converter 14 acts as a digital-to-analog converter. The playback audio data of the even fields is stored in the memory 16 during the playback of each odd field and unloaded through the converter 14 during the time intervals corresponding to each skipped even field. Thus, during playback of the odd video fields, the accompanying audio signal emanates from the AM/FM converter 20 and is gated through the switch 10 and through the audio port 4 to provide the accompanying audio signal. Then, during the period corresponding to the skipped even field, the playback audio signal emanates from the memory 16 and is gated through the switch 12. Therefore there is no break in the playback audio signal. (Various playback techniques are known for filling in for the skipped video so as to avoid "breaks" in the playback video signal and form no part of this invention.)

The frequency multiplexing process performed by the converters 8, 22, 24 is not necessarily restricted to the process described specifically in connection with FIG. 1. For example, the sum and difference of the two audio signals may be frequency multiplexed on different carriers by the converters 8, 22, 24 (in the well-known manner currently used in commerical FM radio boradcasting for FM multiplex stereo transmission and reception).

If the video signal to be recorded is accompanied by a two channel (stereo) audio signal, the two stereo channels of the incoming audio signal may be first multiplexed into a single signal (by means of a multiplexer 30 shown in FIG. 1). This multiplexed audio signal is applied to the audio input port 4.

In an alternative embodiment of the invention, time division multiplexing may be employed instead of, or in addition to, the frequency multiplexing of the odd field and even field audio signals. Referring to FIG. 2, the system of FIG. 1 is enhanced with the addition of a second audio field store memory 16' connected to an additional analog-to-digital converter 14' and a digital-to-analog converter 17'. During recording, the analog-to-digital converters 14, 14' are operated—and the memories 16, 16' are loaded—at a data rate $f_1$ compatible with the incoming audio signal. In order to perform the time compression necessary for time division multiplexing, the digital-to-analog converters 17, 17' are operated—and the memories 16, 16' are unloaded—at a higher data rate, $f_2$.

As in the embodiment of FIG. 1, the clock signals $C_1$ and $C_2$ gate the incoming odd field and even field audio signals through the switches 10, 12, respectively. Thus, for example, the incoming odd field audio signal is loaded into the memory 16' and the even field audio signal is loaded into the memory 16. Unloading of the memories 16, 16' is controlled by clock signals $C_3$ and $C_4$, respectively (illustrated in solid line in FIGS. 3d and e, respectively).

Typically, $f_2$ is twice $f_1$, and the time period of each audio field is time-compressed by a factor of two. Referring to the solid line wave forms of the clock signals $C_3$ and $C_4$ of FIGS. 3d and 3, the audio signals of the odd and even video fields are stored in the "odd" and "even" memories 16', 16, respectively. They are then time-compressed, unloaded and transmitted to the heads 2 during the first and second halves, respectively, of the next odd video field. In this implementation, recording of the audio signal is delayed with respect to the video signal by one frame. Therefore, during playback, it is necessary to delay the reproduced video signal in order to temporally align it with the reproduced audio signal. Other implementations of the invention may be possible in which there is no need to delay the playback video signal with respect to the audio signal.

In yet another embodiment of the invention, the digital output of the audio field store memories 16, 16' may be applied directly to a pulse code modulation (PCM) recording circuit 40 (of the type well known in the art) for recording in extended portions of each video tape track. For example, the audio signal could be compressed and recorded in an 8mm industry standard video cassette recorder in the so-called PCM tracks, i.e., those tracks scanned by the record heads during rotation from 180° to 216°. In this case, the clock signal $C_3$ and $C_4$ would be modified to follow the dashed line wave forms of FIGS. 3d and 3e, instead of the solid line wave forms of those figures. The result is illustrated in FIG. 4. The odd video fields are recorded in a plurality of "main" tape tracks 40 scanned by individual ones of the heads 2 during each half-rotation (0°–180°) of the drum 1 of FIG. 1. The incoming audio signal of the odd and even fields of a given frame are first stored in the odd and even memories 16′, 16 (during the corresponding odd and even video fields), respectively, then unloaded and recorded sequentially (for example) in that one of the extended track portions 42 scanned by one of the heads 2 during the next drum rotation from 180° to 216°, in accordance with the industry standard 8 mm video cassette recording format.

The invention has been described in detail with particular reference to preferred embodiments thereof, but it will be understood that variations and modifications can be made within the spirit and scope of the invention.

What is claimed is:

1. A skip-field video recording system adapted to skip-field record an incoming video signal comprising successive video frames, each of said frames comprising first and second fields, said first and second fields being associated wtih first and second field audio signals respectively, said recording system comprising:

a rotatable drum;

two opposing heads mounted on said drum;

means for transporting a video tape around more than one half of said drum through an angle in the neighborhood of 216° while rotating said drum, whereby said heads each trace a diagonal track on said tape during each revlotion of said drum, said track comprising a main track portion traced by a corresponding one of said heads during a rotation of said drum through a first angle in the neighborhood of 180° and an extended track portion traced immediately thereafter during rotation of said drum through an additional angle in the neighborhood of about 36°, whereby successive tracks are traced side-by-side in parallel fashion on said tape by said heads, said tracks extending in a direction diagonal to the direction of said tape;

video switch means connected to receive said video signal, said video switch means being controlled in such a manner as to be closed only during the reception of one of said first and second video fields;

video processing cirucit means connected to receive only said one video field from said video switch means and to transmit said one video field to a corresponding one of said first and second heads in such a manner that said one video field is recorded along the entire length of a corresponding one of said main track portions, whereby alternate video fields of said incoming video signal are recorded in successive ones of said main track portions by corresponding ones of said heads;

first audio switch means connected to receive said audio signal and being controlled in such a manner as to be closed only during the reception of the first field audio signal of each successive one of said video frames;

first analog-to-digital converter means, connected to receive said first field audio signal from said first audio switch means, for converting said first field audio signal to digital form so as to produce a digital version thereof;

first audio field store memory means connected to said first analog-to-digital converter means and being controlled in such a manner as to receive from said first analog-to-digital converter means and store the digital version of said first field audio signal and to unload said digital version of said first field audio signal during a time interval corresponding to the tracing by a corresponding one of said heads of one half of a corresponding one of said extended track portions;

second audio switch means connected to receive said audio signal and being controlled in such a manner as to be closed only during receipt of said second field audio signal;

second analog-to-digital converter means, connected to receive said second field audio signal from said second audio switch means, for converting said second field audio signal to digital form so as to produce a digital version thereof;

second audio field store memory means connected to said second analog-to-digital converter means and being controlled in such a manner as to receive from said second analog-to-digital converter means and store said digital version of said second field audio signal and to unload said digital version of said second field audio signal during a time interval corresponding to the tracing by the corresponding one of said heads the other half of said corresponding one of said extended track portions;

pulse code modulation circuit means connected to said first and second audio field store memory means so as to receive the digital versions of said first and second field audio signal from said first and second audio field store memory means respectively as they are unloaded therefrom in succession and to convert them to first and second pulse code modulation signals respectively, and for transmitting said pulse code modulation signals to said heads, whereby said first pulse modulation coded signal corresponding to the digital version of said first field audio signal is recorded in one half of one of said extended track portions and said second pulse code modulation signal corresponding to the digital version of said second field audio signal is recorded in the other half of said one extended track portion, whereby said video tape may be transported at one half standard tape speed to accommodate skip-field recording of only alternate fields of said incoming video signal in successive main track portions on said tape, while the entirety of the audio signal of all fields of said incoming signal is recorded in said extended track portions thereof.

* * * * *